UNITED STATES PATENT OFFICE 2,549,694

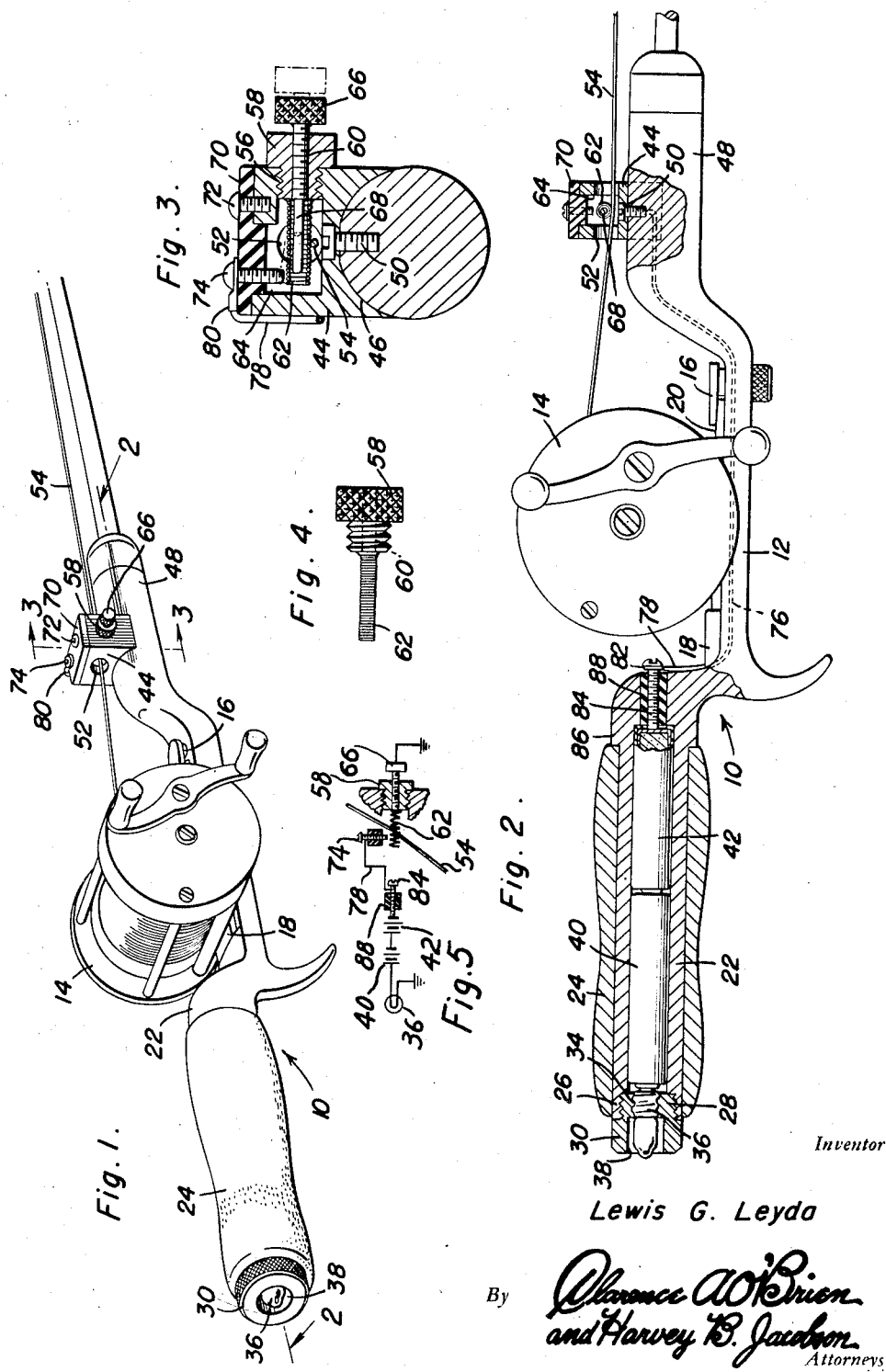

SIGNAL ATTACHMENT FOR FISHING POLES

Lewis G. Leyda, Charleroi, Pa.

Application February 17, 1949, Serial No. 76,865

3 Claims. (Cl. 43—17)

This invention relates to new and useful improvements in signalling devices and the primary object of the present invention is to provide a novel and improved switch mechanism of that disclosed in my co-pending application No. 37,237 filed July 6, 1948, now Patent No. 2,506,370 issued May 2, 1950.

Another important object of the present invention is to provide a signal attachment for fishing poles including an electrical signal, a switch member controlling the signal, and embodying novel and improved means associated with the switch member whereby a predetermined amount of pull on a fishing line will urge the switch member to a circuit closing position to energize the signal.

Yet another important object of the present invention is to provide a fishing rod handle that is quickly and readily converted into a flashlight in a convenient manner.

A further object of the present invention is to provide a fishing rod handle including an electrically operated signal that is applied or removed from the handle without in any way interfering with the normal structure of the handle.

A still further aim of the present invention is to provide a fishing rod handle that is extremely small and compact in structure and having a signal attachment therefor that is so constructed as to effect the normal balance or use of the handle.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention;

Figure 2 is a longitudinal vertical sectional view taken substantially on the plane of section line 2—2 of Figure 1;

Figure 3 is a transverse vertical sectional view taken substantially on the plane of section line 3—3 of Figure 1;

Figure 4 is a side view of the switch member used in conjunction with the present invention; and Figure 5 is a schematic diagram showing the electrical circuit used in the present invention.

Referring now to the drawing in detail, wherein for the purpose of illustration, there is disclosed a preferred embodiment of the present invention, the numeral 10 represents the present conductive fishing rod handle generally, having a central offset portion 12 that receives a fishing reel 14. The reel 14 is held in the offset portion 12 by any suitable means, such as a pivotal latch 16 and a retaining lip 18 which cooperate to grip the attaching base or strip 20 of the reel.

The fishing rod handle 10 is provided with a hollow rear portion 22 that is embraced by a gripping surface, such as a cork sleeve or the like 24, and the internally threaded rear end 26 of the portion 22 receives the threaded end 28 of a cap 30. Cap 30 includes an internally threaded aperture 34 that receivably engages the base of a lamp bulb or light 36 and the head of the bulb is received in a recess or socket 38 provided in the cap to protect the bulb against accidental breakage.

A pair of batteries 40 and 42 are mounted in the portion 22 and are arranged so that the terminal of the battery 42 contacts the base of the battery 40 and the terminal of the battery 40 contacts the base of the bulb 36. Obviously, a single battery or any suitable number of batteries may be used without departing from the scope of the present structure.

The numeral 44 represents a conductive support or rectangular housing having a concaved recess 46 that receives the forward end portion 48 of the handle 10. A fastener 50 detachably secures the support to the forward end portion of the handle.

A guide bore 52 extends through the support 44 and is disposed longitudinally of the handle 10 to slidably receive a fishing line 54 carried by the reel 14.

An internally threaded opening 56 is provided in the support 44 and receivably engages a plug 58 having an axial, internally threaded bore 60. One end of a coil spring or flexible element 62 is suitably fixed to the plug 58 and is disposed within a recess 64 formed in the support and perpendicular to and above the line 54.

The bore 60 receivably engages the threaded end of a headed bolt or adjusting screw 66 and the threaded end of the bolt 66 includes a reduced extension 68 that is telescopically received by the coil spring 62.

The entrance to the recess 64 is closed by an insulating strip 70 that is detachably secured to the support by fasteners or the like 72 and the strip 70 adjustably supports a contact or fastener 74 that is disposed perpendicular to the coil spring 62 and which is normally spaced from the coil spring.

A passage 76 extends through the handle 10 and receives an insulated grounding wire or conductor 78 having exposed forward and rear ends 80 and 82. The forward end 80 of the conductor 78 is secured to the contact 74 and the rear end 82 of the conductor 78 is secured to a fastener or pin 84 that extends through the forward end 86 of the portion 22 to contact the base of battery 42. The pin 84 is insulated from the handle by an insulating sleeve or bushing 88.

It is preferred that the pin 84 be threaded into the sleeve 88 so that the same can urge the batteries toward the lamp bulb 36 and prevent rattling or longitudinal movement of the batteries during handling or use of the present handle construction.

In practical use of the present invention, as a fish pulls on the line 54, the spring 62 will vibrate or flex to contact the element 74 thereby completing a circuit to the bulb 36 and energizing the said bulb.

By adjusting the member 66 and the portion or extension 68 longitudinally with respect to the coil spring 62, a predetermined pull on the line will be required before the spring 62 flexes sufficiently to contact the element 74.

When it is desired to employ the present structure as a flashlight or safety light, the reel brake is set, and the line 54 extending adjacent the forward side of the switch device is wrapped about the support or the elements 58 and 66 to force the spring 62 against the contact 74.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a conductive fishing rod handle, a switch comprising a conductive support mounted on the handle, a contact carried by the support, a coil spring secured at one end to the support and having a free end disposed adjacent the contact and responsive to a pressure on a fishing line for engaging the contact, and means threaded to said support and extending axially through said coil spring for limiting the flexing movement of said spring whereby a predetermined pull on a fishing line is required for flexing the spring into engagement with the contact.

2. In a fishing rod handle supporting a line, a conductive support mounted on said handle and having an opening slidably receiving the fishing line, a conductor on the support, said conductor being insulated from the support, a plug carried by said support, a coil spring fixed to said support and normally spaced from the conductor, said coil spring overlying said line and being responsive to a pull on the line for contacting the conductor, and adjustable means carried by the plug opposing flexing movement of the spring toward the conductor.

3. The combination of claim 2 wherein said means includes a threaded member having an end portion telescopically received by said coil spring.

LEWIS G. LEYDA.

REFERENCES CITED

The following references are of record in the file of this patent:

UNITED STATES PATENTS

| Number | Name | Date |
|---|---|---|
| 501,777 | Fisher | July 18, 1893 |
| 1,411,787 | Kaufman | Apr. 4, 1922 |
| 1,707,901 | Bubb | Apr. 2, 1929 |
| 1,752,397 | See | Apr. 1, 1930 |
| 1,964,949 | Janzen | July 3, 1934 |
| 2,196,784 | Simmons | Apr. 9, 1940 |
| 2,409,988 | Schwebs | Oct. 22, 1946 |